United States Patent
Ennsbrunner

(10) Patent No.: US 10,646,947 B2
(45) Date of Patent: May 12, 2020

(54) WELDING WIRE CARTRIDGE WITH MOISTURE PROTECTION

(71) Applicant: FRONIUS INTERNATIONAL GmbH, Pettenbach (AT)

(72) Inventor: Helmut Ennsbrunner, Leonding (AT)

(73) Assignee: FRONIUS INTERNATIONAL GmbH, Pettenbach (AT)

( * ) Notice: Subject to any disclaimer, the term of this patent is extended or adjusted under 35 U.S.C. 154(b) by 350 days.

(21) Appl. No.: 15/525,434

(22) PCT Filed: Nov. 10, 2015

(86) PCT No.: PCT/EP2015/076176
§ 371 (c)(1),
(2) Date: May 9, 2017

(87) PCT Pub. No.: WO2016/075125
PCT Pub. Date: May 19, 2016

(65) Prior Publication Data
US 2017/0320158 A1 Nov. 9, 2017

(30) Foreign Application Priority Data

Nov. 10, 2014 (DE) .................. 10 2014 222 905

(51) Int. Cl.
*B23K 9/32* (2006.01)
*B23K 9/00* (2006.01)
(Continued)

(52) U.S. Cl.
CPC .............. *B23K 9/325* (2013.01); *B23K 9/133* (2013.01); *B23K 9/164* (2013.01); *B23K 9/32* (2013.01);
(Continued)

(58) Field of Classification Search
CPC ...... B01D 53/263; B23K 35/38; B23K 9/133; B23K 9/164; B23K 9/32; B23K 9/325; F24F 11/30; F24F 2110/20
(Continued)

(56) References Cited

U.S. PATENT DOCUMENTS 3,108,176 A 10/1963 Simon et al.
4,139,758 A 2/1979 Pinfold
(Continued)

FOREIGN PATENT DOCUMENTS

DE 10 2004 011 484 9/2005

OTHER PUBLICATIONS

English translation of DE102004011848, Sep. 2005 (Year: 2005).*
(Continued)

*Primary Examiner* — Sang Y Paik
(74) *Attorney, Agent, or Firm* — Greenblum & Bernstein, P.L.C.

(57) ABSTRACT

In order to reduce the accumulation of moisture on a welding wire (2, 2', 2") arranged in a welding wire cartridge (1, 1a, 1b) or to remove existing moisture in a simple and reliable manner, it is provided that a flow ($D_1$) of purging air supplied to the welding wire cartridge (1, 1a, 1b) is adjusted by a flow control unit (14), the purging air is supplied to the flow control unit (14) at a first pressure (p) and is discharged at a purging air discharge (24) of the welding wire cartridge (1, 1a, 1b) at a third pressure ($p_{at}$), and at a purging air feed (15) of the welding wire cartridge (1, 1a, 1b) a second pressure ($p_1$) at the purging air feed (15) that is lower than the first pressure (p) results from the adjusted flow ($D_1$), the third flow ($p_{at}$) and a flow resistance between the purging air feed (15) and the purging air discharge (24), the relative
(Continued)

Figure 1:
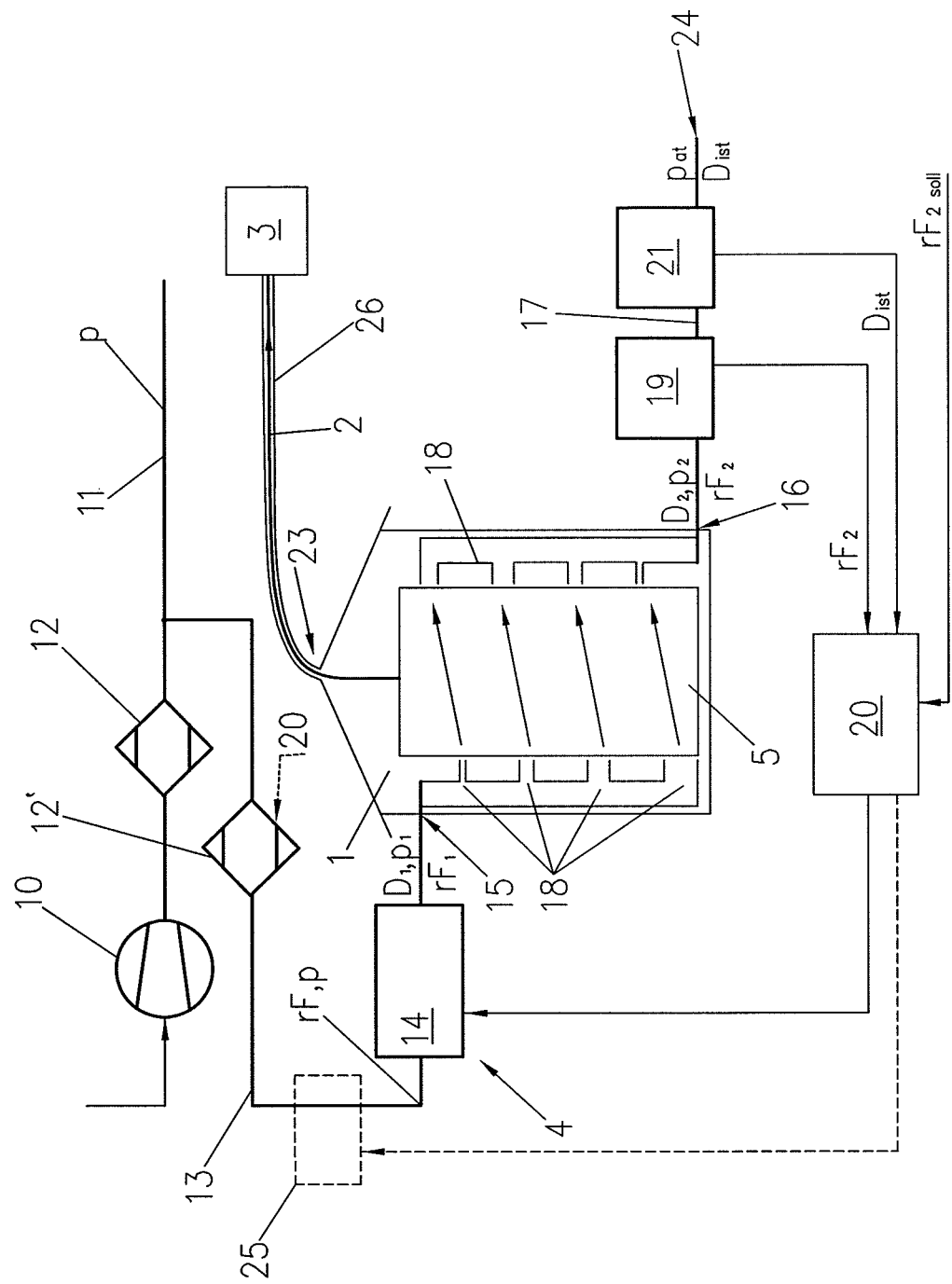

humidity ($rF_1$) of the purging air being reduced by the relief of pressure from the first pressure (p) to the second pressure ($p_1$).

19 Claims, 3 Drawing Sheets

(51) Int. Cl.
| | | |
|---|---|---|
| *B23K 9/133* | (2006.01) | |
| *B23K 9/16* | (2006.01) | |
| *B23K 35/38* | (2006.01) | |
| *F24F 110/20* | (2018.01) | |
| *F24F 11/30* | (2018.01) | |
| *B01D 53/26* | (2006.01) | |

(52) U.S. Cl.
CPC ............ *B23K 35/38* (2013.01); *B01D 53/263* (2013.01); *F24F 11/30* (2018.01); *F24F 2110/20* (2018.01)

(58) Field of Classification Search
USPC ............................................. 219/136–145.41
See application file for complete search history.

(56) References Cited

U.S. PATENT DOCUMENTS

| | | | | |
|---|---|---|---|---|
| 4,559,065 | A | * | 12/1985 | Null ................. B01D 53/0446 96/111 |
| 5,988,233 | A | * | 11/1999 | Fosnight ........... H01L 21/67393 141/63 |
| 2003/0186110 | A1 | * | 10/2003 | Sloop ..................... H01G 9/038 429/49 |
| 2004/0182472 | A1 | * | 9/2004 | Aggarwal ......... H01L 21/67393 141/98 |
| 2006/0131292 | A1 | | 6/2006 | Albrecht et al. |
| 2011/0168678 | A1 | * | 7/2011 | Takeda .................. B23K 9/164 219/74 |
| 2012/0096740 | A1 | * | 4/2012 | Naylor ..................... F17D 1/04 34/562 |
| 2013/0149620 | A1 | * | 6/2013 | Fabian .............. H01M 8/04082 429/416 |
| 2014/0367366 | A1 | | 12/2014 | Bertram et al. |

OTHER PUBLICATIONS

German Office Action conducted in counterpart German Appln. No. 10 2014 222 905.7 (dated Sep. 25, 2015) (w/ Machine translation).

* cited by examiner

WELDING WIRE CARTRIDGE WITH MOISTURE PROTECTION

The present invention relates to a welding wire cartridge for holding a welding wire having a protective device against moisture, wherein a purging air feed on the welding wire cartridge, into which a purging air supply line for feeding dry purging air discharges, and a purging air discharge having a purging air outlet for discharging purging air are provided, and to a method for protecting a welding wire in a welding wire cartridge against moisture.

A known problem in inert gas welding of certain materials, in particular aluminum, titanium or other highly reactive metals, is the so-called hydrogen porosity. This results in porosities caused by hydrogen in the area of the weld that degrade the quality of the weld or even make the weld useless. Hydrogen is frequently introduced, for example, through the supplied welding wire, because the welding wire absorbs moisture from the environment and free hydrogen is produced from this humidity because of the high temperature at the weld site. In the case of an aluminum wire as the welding wire, the aluminum wire absorbs moisture from the atmospheric humidity and stores it in the aluminum oxide surface of the aluminum wire in the form of water and aluminum hydroxide.

In order to keep the water content of the welding wire to a minimum, the welding wire cartridge has already been temperature controlled up to this point to reduce the relative humidity in the immediate vicinity of the welding wire in the welding wire cartridge. Controlling the temperature of the welding wire magazine, however, requires an additional equipment expense and also means that the welding wire and the wire feed path must be operated at a higher temperature than the ambient temperature and thus are exposed to increased wear. This can increase the equipment and safety costs of the welding wire cartridge and the welding wire feed. Moreover, the tendency toward oxidation on the welding wire, which can also be detrimental to the welding process, increases with the temperature. Disadvantageous are also the increased energy usage and the aggravated handling for the welder, because an excess temperature of approximately 40° C., depending upon the surrounding environment, is required for sustainable drying.

A welding wire cartridge is known from U.S. Pat. No. 3,108,176 A that is hermetically sealed and supplied with an inert gas under pressure, wherein dry air can also be used as an inert gas. The pressure is adjusted by a pressure reducer, as is available on conventional gas supplies in the form of gas bottles, for example. Penetration of moisture into the welding wire cartridge can thus be prevented. The disadvantage of this method is that no active removal is provided for moisture that is introduced into the system when the welding wires are inserted. In addition, the hermetic seal massively complicates the handling of the system as a whole, increases the costs and degrades mobility. Furthermore, the use of gas bottles is proposed for supplying the inert gas or dry air, which is disadvantageous in terms of costs and logistics. The use of a pressure regulator for applying an overpressure to the whole system has additional disadvantages, which could lead to very high mass flows of the inert gas out of the system in the case of leaks, which again results in high costs.

Likewise, it is also already known to purge or flush the welding wire cartridge with an inert and dry purging gas in order to keep water away from the welding wire in the welding wire cartridge. Such a device is illustrated, for example, in DE 10 2004 011 484 A1, where argon, for example is used as a purging gas. The purging gas is made available in a gas bottle and supplied to the welding wire cartridge via purging air line. A disadvantage arises here, however, in that a dedicated purging gas is required that must be stored. It must also always be checked whether the gas bottle still contains sufficient purging gas and which must be replaced before it becomes empty. The welding personnel must also be additionally trained in order to operate the purging device correctly. The inert purging gas also causes high expenses because a permanent gas flow is necessary and large amounts of purging gas are thus required. The use of an inert purging gas also forms a potential hazard because, with the constant escape of purging gas, premises can be flushed with purging gas and thus threaten the welding personnel with suffocation. Stringent safety measures are therefore required. This method should not ever be used without seal monitoring and without directed conduction of the purging gas (towards the outside, for example). This increases the effort for the welding process and also leads to higher costs.

It is therefore an object of the present invention to specify a method and a device by which moisture can be removed from welding wire in a simple and safe manner and the further accumulation of moisture can at least be reduced, preferably prevented.

This object is achieved for the welding wire cartridge in that a flow control unit is arranged in the purging air supply line that adjusts a flow of purging air through the welding wire cartridge, a first pressure operates upstream of the flow control unit in the purging air supply line, a second pressure that is lower than the first pressure operates downstream from the flow control unit in the purging air supply line and at the purging air feed, a third pressure that is lower than the second pressure operates at the purging air discharge, and the second pressure at the purging air feed results from the adjusted flow, the third pressure and the flow resistance between the purging air feed and the purging air discharge, the relative humidity being reduced by the relief of pressure from the first pressure to the second pressure.

The method according to the invention is thus characterized in that the purging air is supplied at a first pressure and a first relative humidity to a flow control unit, in which a flow of purging air is adjusted. The adjusted flow, the pressure at the purging air outlet and the flow conditions in the welding wire cartridge result in a lower, second pressure at the purging air feed. This ensuing pressure differential between the second and third pressures and the pressure relief of purging air at the flow control unit leads automatically to a reduction of the relative humidity from a first relative humidity upstream of the flow control unit to a second relative humidity downstream from the flow control unit. The welding wire cartridge is then purged with this flow of purging air dried in this manner. The pressure relations in the welding wire cartridge (pressure upstream of the flow control unit, pressure downstream from the flow control unit, pressure at the purging air feed, pressure at the purging air discharge) essentially result from the adjusted flow, the third pressure and the flow resistance in the lines and in the welding wire cartridge. In order to achieve sufficient purging air drying, a sufficiently high supply pressure is advantageous and the flow resistances in the lines and in the welding wire cartridge are advantageously low. Both can be easily ensured or achieved through appropriate dimensioning. The adjusted flow though the welding wire cartridge can achieve an active dehumidification of the welding wire cartridge because moisture is absorbed by the dry purging air flowing through and is removed from the welding wire cartridge. The operational costs of the dehumidification or of the protection from humidity thus achieved are primarily defined in terms of the compressed air consumption. Because this solution is centered around a flow control device, these costs can always be monitored and leaks in the system also are not a problem.

In this way, the moisture of the supplied purging air can be reduced in a simple and safe manner so that the welding wire cartridge can be purged using dry air in order to minimize the hydrogen penetration into the welding wire cartridge and thus also to protect the welding wire from the increased oxidation or corrosion associated with moisture. Compressed environmental air can thus be used for purging and the use of special purging gases or gas bottles is not required. This method is also very robust because, based on the design according to the invention (low flow resistances, constant and sufficient supply pressure), the relative humidity achieved by the pressure relief is essentially independent of the flow through the flow control unit. Similarly, the use of purging air is an advantage because it is without risk, can be created on site and is available practically without limits. Using the resulting flow of dry purging air through the welding wire cartridge, the purging air absorbs any possible moisture penetrating into the welding wire cartridge and transports it out of the welding wire cartridge. There is therefore no need to design the welding wire cartridge in a sealed manner or to place it under high pressure in order to prevent moisture penetration.

If the flow of purging air through the welding wire cartridge is set by the flow control unit, a simple control method for setting the relative humidity of the purging air at the purging air discharge can be realized. The removal of moisture from the welding wire cartridge can thus be accelerated by increasing the flow. Conversely, a low flow can be set if the relative humidity in the welding wire cartridge is sufficiently low, whereupon energy and expense can be spared.

The relative humidity of the supplied purging air can be reduced if an adjustable dehumidifier or a pressure regulation unit is arranged in the purging air supply line upstream of the flow control unit. This dehumidifier has no effect on the pressure relations and also protects other compressed air users from excess humidity. A dehumidifier in the supplied purging air can lower the relative humidity of the purging air at the purging air feed and thus consequently also the need-based flow.

By using a moisture sensor at the purging air discharge, the relative humidity of the purged air discharged from the welding wire cartridge can be measured and the measured value can be used as an actual value for controlling the humidity in the welding wire cartridge. The determination and setting of the need-based flow can thus take place automatically.

Using a flow sensor at the purging air discharge, it can easily be determined whether an unusually large quantity of purging air is lost that can indicate a large leak in the welding wire cartridge or some other malfunction. It can further be checked using this flow sensor whether the humidity sensor is being properly flushed by purging air from the welding wire cartridge. Only if this is the case is the measurement of the relative humidity in the outlet line representative of the humidity in the welding wire cartridge and thus correct.

In order to supply the welding wire in the welding wire cartridge evenly with purging air, a purging air guide device can be provided in the welding wire cartridge.

In order to also be able to purge the welding wire in the wire feed hose, it can be provided that the wire feed hose is used as a purging air discharge, if necessary as an additional purging air discharge.

The present invention is explained below with reference to FIGS. 1 to 4, showing exemplary, schematic and non-restrictive advantageous embodiments of the invention. Shown are FIG. 1 an welding wire cartridge having a safety device according to the invention, FIG. 2 an arrangement having two welding wire cartridges connected in series, FIG. 3 a simple control for the flow of dry purging air and FIG. 4 a block diagram of a simple control concept.

A welding wire cartridge 1 is illustrated in FIG. 1, in which a welding wire 2 is inserted in a customary manner and is removed from the welding wire cartridge 1 in a welding process 3 (not depicted here in detail) and used for welding. A welding device having necessary additional equipment, such as an inert gas supply, for welding process 3 is well known and is not described or illustrated in detail here. A feed unit for conveying welding wire 2 can be provided in the welding wire cartridge 1 but can also be arranged in the welding device itself and/or in the welding torch. Welding wire 2 is generally inserted into welding wire cartridge 1 in the form of a welding wire coil 5, as indicated in FIG. 1. In order to protect the welding wire 2 from the moisture contained in the ambient air, a safety device 4 is provided that is described in detail below.

Via a compressor 10, ambient air is compressed and purging air with pressure p is created and made available via a compressed air line 11. A dehumidifier 12 is generally already contained in compressed air line 11, in the simplest case in the form of a water separator, which reduces the relative humidity rF of the created purging air or carries away the precipitated water. Compressed air is generally available in every manufacturing facility because many components in a manufacturing facility, such as various tools, require a compressed air supply and is, therefore, not normally a part of safety device 4 which in turn represents a cost savings. However, safety device 4 can, of course, also be equipped with its own compressor for creating compressed air from ambient air if no suitable compressed air supply is available on site.

Safety device 4 receives purging air from compressed air line 11 via a purging air supply line 13. If a dehumidifier 12 is provided in compressed air line 11 (which will generally be the case), purging air supply line 13 preferably branches off downstream from dehumidifier 12.

Purging air having a first pressure p and having a relative humidity rF is thus available in purging air supply line 13. An additional dehumidifier 12' can also be arranged in purging air supply line 13. It is also conceivable that a pressure regulation unit 25 can be arranged in purging air supply line 13, for example in order to raise or lower pressure p in compressed air line 11 for safety device 4. Additional dehumidifier 12' and/or pressure regulation unit 25 can also be controlled in order to set a desired first relative humidity rF or a desired first pressure p in purging air supply line 13.

Using a flow control unit 14 in purging air supply line 13, the need-based flow of purging air through welding wire cartridge 1 is set and prevailing first pressure p upstream of flow control unit 14 is thereby reduced to the second pressure $p_1$ in purging air supply line 13 downstream from flow control unit 14. Flow control unit 14 can be designed as a mass flow regulator to regulate a mass flow or equivalently as a volumetric flow regulator to regulate a flow volume. In the following, flow D generally refers to mass flow or volumetric flow.

Purging air supply line 13 discharges downstream of flow control unit 14 via a purging air feed 15 into welding wire cartridge 1, through which welding wire cartridge 1 is supplied with purging air feed 15 having a specified flow $D_1$, a specified second pressure $p_1$ and a specified second relative humidity $rF_1$. Welding wire cartridge 1 further has a purging air discharge 16, via which the purging air is removed from welding wire cartridge 1. Flow $D_2$, pressure $p_2$ and relative humidity $rF_2$ are present at purging air discharge 16. Outgoing flow $D_2$ is usually lower than incoming flow $D_1$ because a sealed welding wire cartridge 1 is not required. This means that purging air can also leak from welding wire cartridge 1 at other places of the welding wire cartridge 1. Pressure $p_2$ is only slightly lower than $p_1$ because the flow cross sections in the wire cartridge are sufficiently large. Relative humidity $rF_2$ at purging air discharge 16 is elevated in comparison to relative humidity $rF_1$ at purging air feed 15 because the purging air is enriched with moisture in welding wire cartridge 1 and transports it away.

Purging air discharge 16 can also be connected to a purging air discharge line 17 that forms purging air outlet 24 of purging air discharge 16 and preferably discharges into the environment. Purging air discharge 16 can also discharge directly into the environment, however, and thereby form purging air outlet 24. A third pressure $p_{at}$, preferably the ambient pressure, is present at purging air outlet 24 of purging air discharge 16. Purging air discharge line 17 or purging air discharge 16 itself preferably has a flow cross section large enough that, even at maximum flow $D_{max}$ in welding wire cartridge 1, only a small pressure differential forms between second pressure $p_1$ on purging air feed 15 and third pressure $p_{at}$ at purging air outlet 24 of purging air discharge 16, preferably $(p_1-p_{at}) \approx (p_2-p_{at}) < 0.2$ bar. This means in particular that a sufficiently low flow resistance exists between purging air feed 15 and purging air outlet 24 because of the sufficiently large flow cross section. Second pressure $p_1$ upstream of welding wire cartridge 1 is thus exclusively a function of currently prevailing third pressure $p_{at}$ at purging air outlet 24 of purging air discharge 16 of welding wire cartridge 1 and of the pressure differential $(p_1-p_{at})$, that ensues from the low flow resistance and in turn results from the adjusted flow. Second pressure $p_1$ upstream of welding wire cartridge 1 is thus not adjusted, but results from the operation of welding wire cartridge 1. Because of the pressure reduction from first pressure p to second pressure $p_1$ thus taking place, a reduction of moisture in the purging air also necessarily takes place, as is described in detail below.

In welding wire cartridge 1, a purging air guide device 18, in the form of baffles, nozzles, outflow openings, collecting devices, etc., can advantageously be provided in order to ensure as uniform a flow as possible of dehumidified or dried purging air through welding wire cartridge 1 and with it a uniform overflow of welding wire 2 with dehumidified purging air, as indicated in FIG. 1. A commercially available welding wire cartridge 1 (for example a welding wire package or a welding wire drum) is preferably used, however, in order to lower costs, wherein only a purging air feed 15 and a purging air discharge 16 may need to be provided. In the case of a welding wire coil 5, it can also be provided that welding wire coil 5 is radially purged simultaneously from the outside and the inside. It is also conceivable to provide a commercially available welding wire holder that has a welding wire 2 arranged therein with a sealed enclosure having a purging air feed 15 and a purging air discharge 16. An enclosure having a commercially available welding wire holder located therein is considered to be a welding wire cartridge 1 purged by means of dry purging air in the sense of the invention. The enclosure could also be a complete storage area in which a plurality of commercially available welding wire holders can also be stored. Thanks to openings in the welding wire holder, it is to also ensured in this case that welding wire 2 in the welding wire holder is flushed with dry purging air and is thus protected from moisture.

A flow of purging air that ideally corresponds to the need is adjusted in purging air supply line 13 by flow control unit 14, and first pressure p upstream of flow control unit 14 is decompressed to second pressure $p_1$ downstream from flow control unit 14, whereby relative humidity rF of the purging air is changed in a known way in proportion to these two pressures p, $p_1$ according to the (simplified) equation $rF_1=rF*p_1/p$, in particular reduced where $p>p_1$. Flow control unit 14 therefore realizes a reduction of the relative humidity based upon the resulting pressure ratios.

For example, in purging air line 11 there is purging air having a first pressure p=6 bar (a possible drop in pressure in dehumidifier 12 or 12' is disregarded in the description for reasons of simplicity) and a first relative humidity rF=32% (which corresponds to a pressure dew point of 3° C. and is a standard value of a common dehumidifier 12). Second pressure $p_1$ in welding wire cartridge 1 results from the need-based flow set by flow control unit 14, the flow resistances and pressure differential $(p_1-p_{at})$ between purging air feed 15 of welding wire cartridge 1 and purging air outlet 24 of welding wire cartridge 1. Flow control unit 14 effects such a reduction of pressure p to pressure p1. At a third pressure, preferably the ambient pressure, $p_{at}=1.013$ bar at purging air outlet 24 of purging air discharge 16, and at second pressure $p_1 \approx p_2=1.1$ bar at purging air feed 15, second relative humidity $rF_1$ of the purging air in purging air supply line 13 downstream from flow control unit 14, and thus also at purging air feed 15, turns out to be $rF_1=rF*p_1/p=6\%$ (which corresponds to a pressure dew point of −18.6° C.). If it is assumed that there is a higher value for relative humidity in the environment of welding wire cartridge 1 than at purging air feed 15, the relative humidity at purging air outlet 24 and at purging air discharge 16 of welding wire cartridge 1 cannot drop below $rF_1$, meaning $rF_1 \leq rF_2$.

Since second pressure $p_1$ at purging air feed 15 for welding wire cartridge 1 ensues, second relative humidity $rF_1$ of the dry purging air supplied to welding wire cartridge 1 is also predetermined, at least subject to the condition that a constant first pressure p and a constant first relative humidity rF are present. Thus flow $D_1$ of dry purging air through welding wire cartridge 1 having relative humidity $rF_1$ can be regulated by flow control unit 14 to adjust the humidity in welding wire cartridge 1.

If a moisture sensor 19 is arranged in purging air discharge line 17 that measures the prevailing relative humidity $rF_2$ at purging air discharge 16 in flow $D_2$, a simple flow control can be implemented that automatically determines the correct, need-based flow.

It can be assumed that first pressure p in compressed air line 11 always remains constant because other components in the manufacturing facility must also be supplied by it. The third pressure, generally the ambient pressure, $p_{at}$, is also essentially constant because outlet 24 of the purging air preferably is into the environment. Thus a sufficient pressure differential $(p_1-p_{at})$ is always available so that flow control device 14 can ensure a need-based flow D from purging air feed 15 through welding wire cartridge 1 to purging air discharge 16.

That minimum flow D on falling below of the maximum permissible moisture at purging air discharge 16 is indicated as need-based flow D. This flow D is needed to comply with the requirements of the operator with respect to moisture. Furthermore, the need-based flow is influenced by the moisture that is introduced into welding wire cartridge 1 during a changing operation, by the moisture that penetrates through the surface of welding wire cartridge 1, by the relative humidity $rF_1$ that the purging air at purging air feed 15 contains and by the maximum allowed humidity $rF_2$ at purging air discharge 16.

Flow $D_1$ supplied to welding wire cartridge 1 is thus regulated by flow control unit 14 in such a manner that relative humidity $rF_2$ at purging air discharge 16 is maintained below a maximum value $rF_{2,soll}$ to be defined by the user. If prevailing humidity $rF_2$ measured at purging air discharge 16 by moisture sensor 19 is below the maximum value, flow $D_1$ can be reduced because less purging air is apparently sufficient to carry away the moisture from welding wire cartridge 1. The consumption of purging air is thus reduced and energy is saved. If, however, moisture enters into welding wire cartridge 1 because of leaks in welding wire cartridge 1 and the penetrating moisture cannot be removed by currently supplied flow $D_1$, relative humidity $rF_2$ present at purging air discharge 16 will rise. In this case, flow $D_1$ of purging air is increased in order to be able to carry the excess moisture that is present away from welding wire cartridge 1 and to bring relative humidity $rF_2$ back below the allowed maximum value $rf_{2,soll}$.

Figure 3:
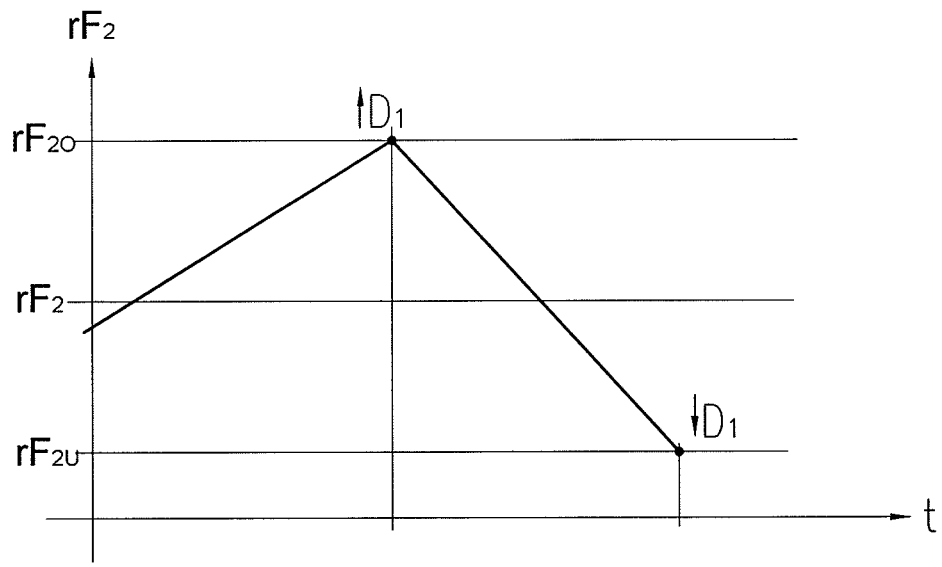
Figure 4:
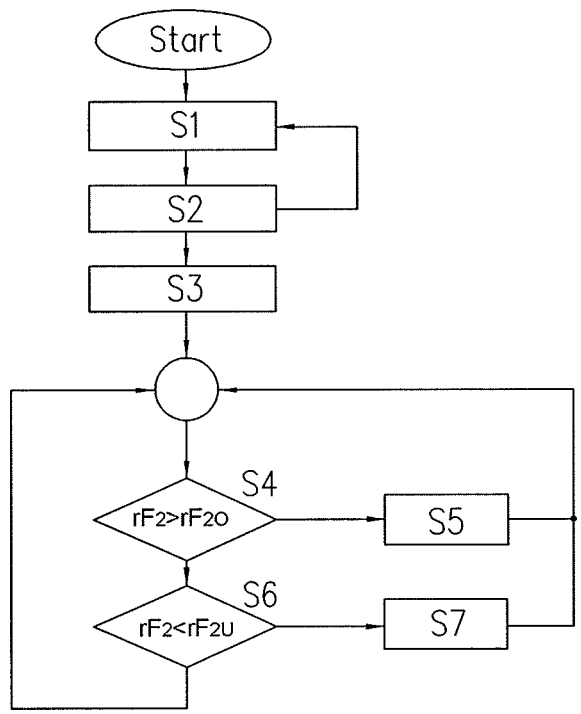

In order to prevent a continuous switching of safety device 4, an upper threshold value $rF_{2O}$ (equal to maximum relative humidity $rF_{2,soll}$) and a lower threshold $rF_{2U}$ (less than the maximum relative humidity $rF_2$) can be defined or specified for prevailing relative humidity $rF_2$ that specify the switching points for increasing or lowering flow $D_1$, as shown in FIG. 3. However, relative humidity $rF_2$ can also be regulated to a specified relative humidity $rF_{2,soll}$ in a closed-loop control via an implemented control rule. To do this, a control unit 20, which regulates flow $D_1$, can be provided as indicated in FIG. 1.

It can also be provided that second relative humidity $rF_1$ can be adjusted at purging air feed 15. If, for example, an additional adjustable dehumidifier 12' or a pressure control unit 25 (indicated in FIG. 1) is arranged in purging air supply line 13, second relative humidity $rF_1$ can be adjusted in accordance with the above relationship $rF_1=rF*p_1/p$, if first pressure p and/or first relative humidity rF is altered in purging air supply line 13 upstream of flow control unit 14. In this case, one could also completely omit control of flow $D_1$ and set a constant flow $D_1$, for example. It is also conceivable, however, to apply the adjustment of first relative humidity rF and/or of first pressure pin purging air supply line 13 in addition to control flow D. It is important to understand, however, that the pressure differential ($p_1-p_{at}$) between purging air feed 15 and purging air outlet 24 is not affected by controlling first pressure p, but rather only second relative humidity $rF_1$.

However, precise control of prevailing relative humidity $rF_2$ at purging air discharge 16 is mostly not mandatory, and a simplified method for operating safety device 4 can often be sufficient. This is because there is no "too dry" when storing welding wire, and it must therefore only be monitored that a maximum relative humidity $rF_{2,soll}$ at purging air discharge 16 is not exceeded. A possible, simple control concept is described below in reference to FIG. 4.

In step S1, after safety device 4 is switched on, a specified flow $D_1$, preferably a minimum flow $D_{min}$, is set. In step S2, it can be verified whether welding wire cartridge 1 is closed ($D_1=D_2$). If this is the case, a quick dehumidification can be provided in step S3. To do this, a specified maximum flow value $D_{max}$ is set for a specified, determined time or until measured relative humidity $rF_2$ has dropped below a specified value in order to dehumidify the volume of welding wire cartridge 1 as quickly as possible. Steps S2 and S3 are optional. It is then continually checked if measured relative humidity $rF_2$ exceeds upper threshold $rF_{2O}$ (step S4) or is below lower threshold $rF_{2U}$ (step S6). If upper threshold $rF_{2O}$ is exceeded, flow $D_1$ is increased (step S5), preferably to the maximum flow $D_{max}$. If lower threshold $rF_{2U}$ is not reached, flow $D_1$ is lowered (step S7), preferably to minimum flow $D_{min}$.

A flow $D_2$ in purging air discharge line 17 can also be measured using flow sensor 21, by which seal tightness of welding wire cartridge 1 can be deduced because supplied flow $D_1$ is known. If flow $D_2$ as measured using flow sensor 21 is significantly lower than an expected or predetermined value (flow $D_1$), a large portion of the purging air is escaping via leaks in welding wire cartridge 1, which can be indicated as fault, for example by control unit 20. It should be noted here that welding wire cartridge 1 is never completely sealed and it can also even be desirable that welding wire cartridge 1 leaks to a certain extent so that moisture penetrating into welding wire cartridge 1 can be quickly dissipated. Flow $D_2$ in purging air discharge line 17 is thus generally lower than supplied flow $D_1$, which is to be taken into account in control unit 20 in determining any unusual leakage in welding wire cartridge 1. A commercially available welding wire cartridge 1 (for example a welding wire package or a welding wire drum) can thus also be used without requiring specialized seals. Thus, there is also no additional expense.

An alternate test of the housing seal tightness can also be performed using moisture sensor 19. If the dry flow escapes at a different place because of leakage, the moisture sensor sooner or later then measures the generally higher ambient humidity and that leads to a fault message in the control/regulation.

It can be provided in an advantageous embodiment to use a wire feed hose 26, through which welding wire 2 is conveyed from welding wire cartridge 1 to welding process 3, as a, if required as an additional, purging air discharge 16 of welding wire cartridge 1. This would have the advantage that welding wire 2 would also be protected from excessive moisture in wire feed hose 26.

Figure 2:
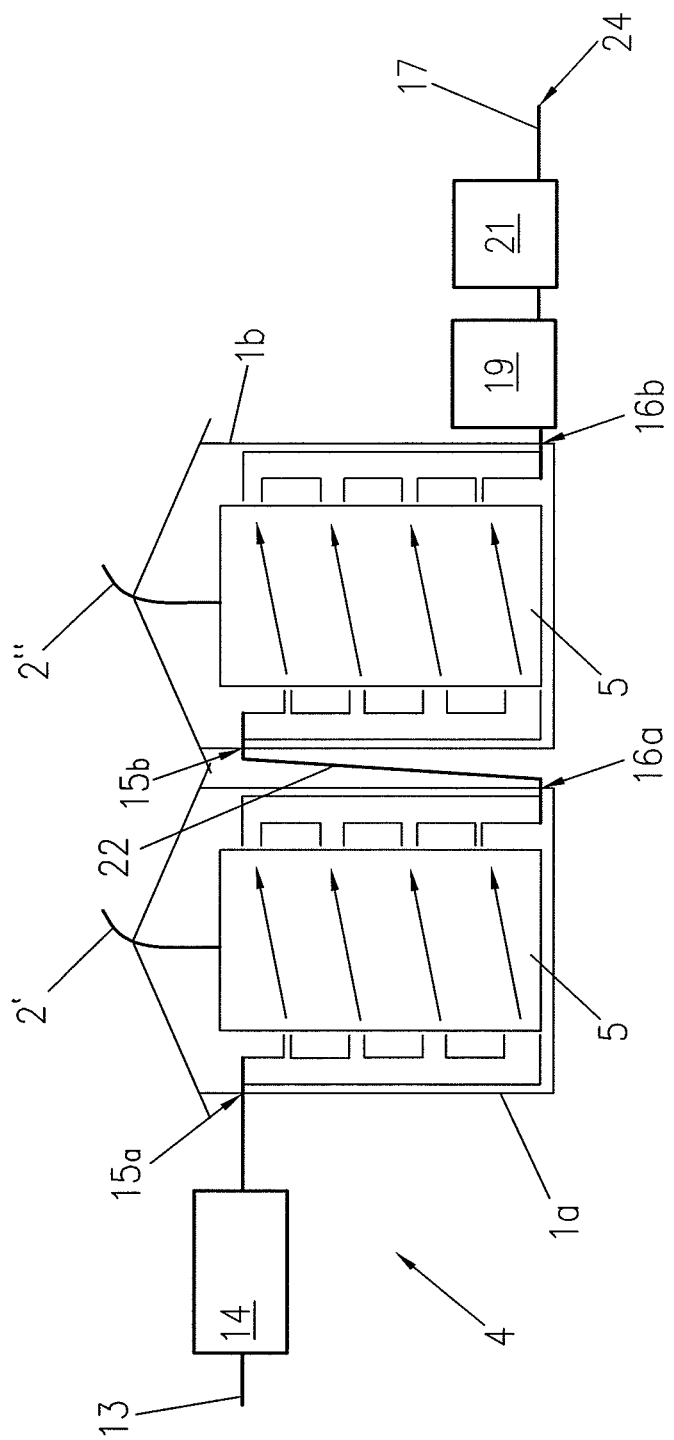

Using safety device 4 according to the invention, a plurality of welding wire cartridges 1a, 1b connected in series can also be operated, as illustrated in FIG. 2. Purging air discharge 16a of a first welding wire cartridge 1 is connected by a connecting line 22 to purging air feed 15b of a downstream, second welding wire cartridge 1b. Purging air discharge line 17 is connected to purging air discharge 16b of second welding wire cartridge 1b, and purging air supply line 13 is connected to purging air feed 15a of first welding wire cartridge 1a. In this manner, even more than two welding wire cartridges 1 can of course be connected together. Thus a plurality of welding wire cartridges 1a, 1b connected in series can be supplied with dehumidified purging air by one safety device 4. Otherwise, the above explanations apply analogously.

Instead of a purging air discharge 16, it could also be provided to use outlet 23 for welding wire 2 or wire feed hose 26 in welding wire cartridge 1 as, if required as additional, purging air discharge 16. In this case, moisture sensor 19 and/or mass flow sensor 21 could also be arranged in the area of outlet 23. Because the flow cross section is generally very low in outlet 23 for the welding wire, only a very low flow $D_1$ can, however, be set if only this outlet 23 is used. Thus, this represents a possible, albeit not optimal, implementation.

The invention claimed is:

1. A welding wire cartridge for holding a welding wire protected against moisture, comprising:
   a purging air supply line for supplying dried purging air;
   a purging air feed arranged to receive the dried purging air discharged from the purging air supply line; and
   a purging air discharge having a purging air outlet for discharging dried purging air out of the welding wire cartridge,
   wherein the purging air supply line, the purging air feed and the purging air discharge are provided on the welding wire cartridge,
   wherein a flow of dried purging air through the welding wire cartridge is adjustable in the purging air supply line such that:
      a first pressure is present upstream of the adjustment of the flow in the purging air supply line,
      a second pressure, which is lower than the first pressure, is present downstream of the adjustment of the flow in the purging air supply line and at the purging air feed, and
      a third pressure, which is lower than the second pressure, is present at the purging air outlet, so that a pressure differential results across the welding wire cartridge,
   wherein the second pressure at the purging air feed results from the adjusted flow, the third pressure and a flow resistance between the purging air feed and the purging air outlet,
   whereby a reduction in relative humidity of the dried purging air results from a relief of pressure from the first pressure to the second pressure.

2. The welding wire cartridge according to claim 1, wherein the pressure differential between the second pressure and the third pressure is less than 0.2 bar.

3. The welding wire cartridge according to claim 1, further comprising a purging air discharge line connected to the purging air discharge, wherein an outlet of the purging air discharge line forms the purging air outlet and discharges into the environment.

4. The welding wire cartridge according to claim 1, wherein the flow of purging air through the welding wire cartridge can be changed in order to adjust the relative humidity of the purging air in the purging air discharge.

5. The welding wire cartridge according to claim 1, further comprising an adjustable dehumidifier arranged in the purging air supply line upstream of the adjustment the flow of purging air through the welding wire, wherein the relative humidity of the purging air upstream of the flow control unit is adjustable by the adjustable dehumidifier.

6. The welding wire cartridge according to claim 1, further comprising a pressure regulator is arranged in the purging air supply line upstream of the adjustment of the flow of purging air through the welding wire cartridge, wherein the pressure regulator sets the first pressure of the purging air upstream of the pressure regulator.

7. The welding wire cartridge according to claim 1, further comprising a moisture sensor arranged on the purging air discharge.

8. The welding wire cartridge according to claim 1, further comprising a flow sensor arranged on the purging air discharge.

9. The welding wire cartridge according to claim 1, further comprising a purging air guide device in the welding wire cartridge.

10. The welding wire cartridge according to claim 1, further comprising a wire feed hose provided on the welding wire cartridge as the purging air discharge.

11. The welding wire cartridge according to claim 1, wherein a relative humidity of the dried purging air at the purging air outlet is higher than at the purging air feed.

12. A method for protecting a welding wire in a welding wire cartridge against humidity, the method comprising:
    supplying dried purging air at a first pressure;
    adjusting a flow of the purging air and supplying the adjusted flow dried purging air to the welding wire cartridge; and
    discharging the dried purging air at a purging air discharge of the welding wire cartridge at a third pressure,
    wherein, at a purging air feed of the welding wire cartridge, a second pressure of the dried purging air that is lower than the first pressure results from the adjusted flow, the third pressure and a flow resistance between the purging air feed and the purging air outlet, whereby a pressure differential across the welding wire cartridge results and
    wherein a reduction in relative humidity of the dried purging air results from a relief of pressure from the first pressure to the second pressure.

13. The method according to claim 12, wherein the pressure differential between the second pressure and the third pressure is adjusted to less than 0.2 bar.

14. The method according to claim 12, wherein the flow of dried purging air through the welding wire cartridge is adjusted in order to set the relative humidity of the dried purging air at the purging air discharge.

15. The method according to claim 12, wherein a first relative humidity of the purging air is altered using a dehumidifier upstream of the adjusting of the flow of the dried purging air.

16. The method according to claim 12, wherein the first pressure of the purging air is altered upstream of the adjusting of the flow of the dried purging air using a pressure regulator upstream of the adjusting of the flow of the dried purging air.

17. The method according to claim 12, wherein the relative humidity is measured downstream of the welding wire cartridge and wherein the adjusting of the flow of the dried purging air or a dehumidifier or a pressure regulator is controlled, in order to set a prescribed relative humidity.

18. The method according to claim 17, wherein the adjusted flow supplied to the welding wire cartridge is controlled so that the relative humidity at the purging air discharge is less than a prescribed maximum relative humidity.

19. The method according to claim 12, wherein the adjusted flow is measured downstream of the welding wire cartridge and an error is indicated if the measured flow remains below a prescribed, expected percentage of the supplied flow.

* * * * *